(12) United States Patent
Wang et al.

(10) Patent No.: US 11,020,895 B2
(45) Date of Patent: Jun. 1, 2021

(54) DIRECT-WRITING POLYIMIDE ADDITIVE MANUFACTURING MATERIAL AND PREPARATION METHOD THEREOF

(71) Applicant: Lanzhou Institute of Chemical Physics, Chinese Academy of Sciences, Lanzhou (CN)

(72) Inventors: Xiaolong Wang, Lanzhou (CN); Yuxiong Guo, Lanzhou (CN); Changyou Yan, Lanzhou (CN); Zhilu Liu, Lanzhou (CN); Feng Zhou, Lanzhou (CN)

(73) Assignee: Lanzhou Institute of Chemical Physics, Chinese Academy of Sciences, Lanzhou (CN)

(*) Notice: Subject to any disclaimer, the term of this patent is extended or adjusted under 35 U.S.C. 154(b) by 196 days.

(21) Appl. No.: 16/255,049

(22) Filed: Jan. 23, 2019

(65) Prior Publication Data

US 2020/0009784 A1    Jan. 9, 2020

(51) Int. Cl.
| | |
|---|---|
| *B29C 64/106* | (2017.01) |
| *B33Y 10/00* | (2015.01) |
| *B33Y 70/00* | (2020.01) |
| *B33Y 30/00* | (2015.01) |
| *B33Y 80/00* | (2015.01) |
| *B29K 79/00* | (2006.01) |

(52) U.S. Cl.
CPC ............ *B29C 64/106* (2017.08); *B33Y 10/00* (2014.12); *B33Y 70/00* (2014.12); *B29K 2079/08* (2013.01); *B33Y 30/00* (2014.12); *B33Y 80/00* (2014.12)

(58) Field of Classification Search
CPC .................................................. C09D 11/107
See application file for complete search history.

(56) References Cited

U.S. PATENT DOCUMENTS 8,420,001 B2 * 4/2013 Leuterer ................ B33Y 70/00
264/497

FOREIGN PATENT DOCUMENTS

| CN | 105153127 A | 12/2015 |
| CN | 105837760 A | 8/2016 |
| CN | 107936685 A * | 4/2018 |

OTHER PUBLICATIONS

Derwent Abstract of CN 108936685 (Year: 2018).*
Guo, Yuxiong, et al., "Solvent-free and photocurable polyimide inks for 3D printing," Journal of Materials Chemistry A, Apr. 18, 2017, pp. 16307-16314, vol. 5, The Royal Society of Chemistry (8 pages).
Hegde, Maruti, et al., "3D Printing All-Aromatic Polyimides using Mask-Projection Stereolithography: Processing the Nonprocessable," Advances Materials, Jun. 19, 2017, vol. 29, 1701240, Wiley-VCH Verlag GmbH & Co. (7 pages).

* cited by examiner

*Primary Examiner* — Alexandre F Ferre
(74) *Attorney, Agent, or Firm* — Wood Herron & Evans LLP

(57) ABSTRACT

A method for preparing a direct-writing polyimide additive manufacturing (AM) material includes (1) conducting ultraviolet curing immediately after the photosensitive polyimide ink is subjected to direct-writing extrusion, to obtain a polyimide precursor formed member; and (2) heat-treating the polyimide precursor formed member obtained in step (1) to obtain the direct-writing polyimide AM material. The direct-writing polyimide AM material obtained by using the method of the present invention has excellent comprehensive properties.

7 Claims, 1 Drawing Sheet

DIRECT-WRITING POLYIMIDE ADDITIVE MANUFACTURING MATERIAL AND PREPARATION METHOD THEREOF

CROSS-REFERENCE TO RELATED APPLICATION

This application claims priority to Chinese application number 201810731353.7, filed on Jul. 5, 2018. The above-mentioned patent application is incorporated herein by reference in its entirety.

TECHNICAL FIELD

The present invention relates to the technical field of additive manufacturing of high-performance materials, and in particular, relates to a direct-writing polyimide additive manufacturing (AM) material and a preparation method thereof.

BACKGROUND

As an engineering plastic with excellent comprehensive properties, polyimides have been widely applied in fields such as aerospace, automotive manufacturing, microelectronics and chemical engineering. However, the rigid molecular chain of the polyimide also brings about problems such as being insoluble, being hard to melt, and being hard to process, while giving the polyimide excellent comprehensive properties. Therefore, most of polyimides on the market are used in a form such as a thin film, a coating, and the like. A three-dimensional polyimide part can be prepared by compression molding and the like, but its resolution, stability and precision are very limited, and it is difficult to realize a three-dimensional part with a complex structure, which has become one of the main bottlenecks limiting the application of polyimide. Therefore, a method for rapid manufacturing a polyimide part having a complex three-dimensional structure with high precision is of great significance to the application of polyimide in various fields.

In recent years, polyimide applied in additive manufacturing (also known as 3D printing) has risen, but its performance and precision can hardly meet the application requirements. At present, polyimide additive manufacturing typically uses a stereolithography (SLA) 3D printing technology to achieve rapid manufacturing of the three-dimensional part. The prior art (including Chinese Patent Application Nos. CN105153127A, CN105837760A) has disclosed patents of photocurable polyimide oligomers and inks, and other prior art (J. Mater. Chem. A, 2017, 5, 16307-16314) has reported the preparation of photocurable polyimide ink and DLP 3D printing, where the photocurable polyimide ink has excellent mechanical and thermal properties as compared to commercially-available acrylic and epoxy polyester photocurable ink materials but has a certain performance gap as compared to polyimides prepared by conventional molding and coating methods. A research group at Virginia Tech University reported that print manufacturing of high-performance wholly-aromatic polyamides was achieved by using a mask lithography technology, through a secondary heat treatment (Adv. Mater. 2017, 29: 1701240). Although this method has high mechanical strength and heat stability, but it has a relatively large volume shrinkage close to 50%, thereby also limiting its further application. Therefore, how to provide a polyimide resin material having high mechanical strength and thermal stability while having a smaller volume shrinkage has become a research focus in the field.

Therefore, it would be desirable to provide a direct-writing polyimide additive manufacturing (AM) material and a preparation method, in which the direct-writing polyimide AM material prepared by the method of the present invention has a small volume shrinkage while having good mechanical strength and thermal stability.

SUMMARY

To achieve the above objective, the present invention provides the following technical solutions, in one embodiment: a method for preparing a direct-writing polyimide AM material includes the steps of: (1) conducting ultraviolet curing immediately after the photosensitive polyimide ink is subjected to direct-writing extrusion, to obtain a polyimide precursor formed member; and (2) heat-treating the polyimide precursor formed member obtained in step (1) to obtain the direct-writing polyimide AM material.

In one aspect, the rate of the direct-writing extrusion in step (1) is 1-15 mm/s.

In another aspect, the nozzle diameter of the direct-writing extrusion in step (1) is 50-500 μm.

In a further aspect, the manner of the direct-writing extrusion in step (1) comprises gas extrusion or screw extrusion.

In yet another aspect, the intensity of the ultraviolet light source for ultraviolet curing in step (1) is 0.5-20 W/cm$^2$.

In some embodiments, the photosensitive polyimide ink of step (1) comprises the following components in parts by weight: 40-60 parts of a photocurable polyamide acid resin, 10-50 parts of a diluent, 1-10 parts of a chain extender, 1-3 parts of an initiator and 5-40 parts of a solvent; and the photosensitive polyimide ink has a viscosity of $10^3$-$10^7$ cP.

In one aspect, the atmosphere for the heat treatment in step (2) comprises nitrogen gas, inert gas or vacuum.

In another aspect, the heat treatment procedure of step (2) is: heating up to 70-80° C. and keeping at this temperature for 0.5-1.5 h; heating up to 120-150° C. and keeping at this temperature for 1-2 h; heating up to 180-200° C. and keeping at this temperature for 1-2 h; heating up to 240-260° C. and keeping at this temperature for 1-3 h; heating up to 280-300° C. and keeping at this temperature for 1-1.5 h; and heating up to 350-400° C. and keeping at this temperature for 0.5-1 h.

The present invention also provides in another embodiment a direct-writing polyimide AM material obtained by the preparation method of the above technical solution, where the direct-writing polyimide AM material has a tensile strength of 80-180 MPa, a volume shrinkage of 6%, a glass transition temperature of 245-300° C., and a bending strength of 150 MPa.

The present invention provides in a further embodiment a method for preparing the direct-writing polyimide AM material, including the steps of: (1) conducting ultraviolet curing immediately after the photosensitive polyimide ink is subjected to direct-writing extrusion, to obtain a polyimide precursor formed member; and (2) heat-treating the polyimide precursor formed member obtained in step (1) to obtain the direct-writing polyimide AM material. The direct-writing extrusion of the present invention is realized based on the principle of single wire stacking, so that the single wire shrinkage force generated by the polyimide ink during an imidization process is largely offset by the bonding and restraint between the wires, thereby reducing the volume shrinkage of the direct-writing polyimide AM material. It can be seen from the embodiments that, the direct-writing polyimide AM material of the present invention has a tensile strength of 80-180 MPa, a volume shrinkage of 6%, a glass transition temperature of 245-300° C., and a bending strength of 150 MPa.

BRIEF DESCRIPTION OF THE DRAWINGS

Various additional features and advantages of the invention will become more apparent to those of ordinary skill in the art upon review of the following detailed description of one or more illustrative embodiments taken in conjunction with the accompanying drawings. The accompanying drawings, which are incorporated in and constitute a part of this specification, illustrate one or more embodiments of the invention and, together with the general description given above and the detailed description given below, explain the one or more embodiments of the invention.

DETAILED DESCRIPTION

Figure 1A:
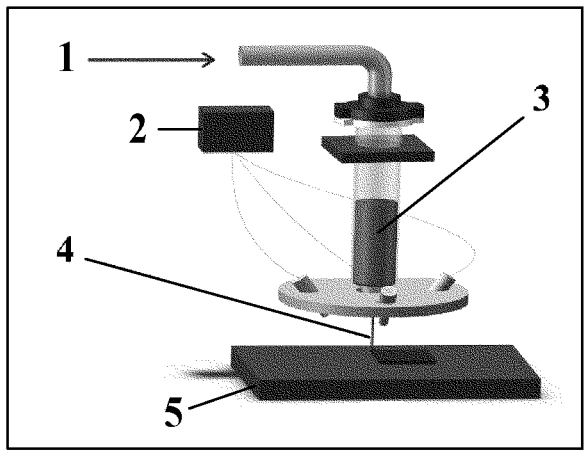
FIG. 1A is a schematic model diagram showing an extrusion-ultraviolet curing device according to one embodiment of the invention.

The following clearly and completely describes the technical solutions in the embodiments of the present invention with reference to the accompanying drawings in the embodiments of the present invention. To make objectives, features, and advantages of the present invention clearer, the following describes embodiments of the present invention in more detail with reference to accompanying drawings and specific implementations.

In one embodiment, the present invention provides a method for preparing a direct-writing polyimide additive manufacturing (AM) material, including the steps of: (1) conducting ultraviolet curing immediately after the photosensitive polyimide ink is subjected to direct-writing extrusion, to obtain a polyimide precursor formed member; and (2) heat-treating the polyimide precursor formed member obtained in step (1) to obtain the direct-writing polyimide AM material.

In the present invention, the ultraviolet curing is conducted immediately after the photosensitive polyimide ink is subjected to the direct-writing extrusion, to obtain the polyimide precursor formed member. In the present invention, the viscosity of the photosensitive polyimide ink is preferably $10^3$-$10^7$ cP. The present invention has no limitation on the composition of the described photosensitive polyimide ink, as long as the photosensitive polyimide ink is enabled to meet the viscosity requirement and be extruded and ultraviolet-cured.

In the present invention, the composition of the photosensitive polyimide ink includes the following components in parts by weight, in one embodiment: 40-60 parts of a photocurable polyimide resin, 10-50 parts of a diluent, 1-10 parts of a chain extender, 1-3 parts of an initiator and 5-40 parts of a solvent; more preferably: 45-55 parts of a photocurable polyamide acid resin, 20-40 parts of a diluent, 3-8 parts of a chain extender, 1.5-2.5 parts of an initiator, and 10-35 parts of a solvent; and most preferably: 47-52 parts of a photocurable polyamide acid resin, 25-30 parts of a diluent, 5-6 parts of a chain extender, 1.8-2.2 parts of an initiator, and 20-30 parts of a solvent.

In the present invention, the photocurable polyimide resin in the photosensitive polyimide ink preferably includes a polyimide resin having an acryloyl or methacryloyl unsaturated double-bond group in a pendant group or terminal group of the molecular chain; and the number average molecular weight of the polyimide resin is preferably 5,000-100,000 kg/mol. The present invention has no particular limitation on the source of the photocurable polyamide acid resin, and a commercially available product well known to those skilled in the art may be used, in particular such as commercial products like GY-2, RC-PAA-F, teyue PAA-2 and PI-100 which are made in China, and ST-2010 DF, CR-6100, and SP-1 available from US DuPont.

In the present invention, the diluent in the photosensitive polyimide ink preferably includes one or more of styrene, N-vinylpyrrolidone, and acrylics.

In the present invention, the chain extender in the photosensitive polyimide ink preferably includes one or more of dipentaerythritol hexaacrylate, propoxylated glyceryl triacrylate, trimethylolpropane triacrylate, and pentaerythritol triacrylate.

In the present invention, the initiator in the photosensitive polyimide ink preferably includes one or more of dimethoxybenzoin, 2-hydroxy-2-methyl-1-phenylacetone, 1-hydroxycyclohexyl phenyl ketone, and 2-hydroxy-4'-(2-hydroxyethoxy)-2-methylphenylacetone.

In the present invention, the solvent in the photosensitive polyimide ink preferably includes one or more of an amide-based organic solvent, tetrahydrofuran, and a ketone-based organic solvent.

In the present invention, the photosensitive polyimide ink is a high-viscosity slurry. It has less content of the solvent, which reduces the volume shrinkage of the photosensitive polyimide ink during an imidization process as caused by solvent evaporation.

In the present invention, the photosensitive polyimide ink preferably enters the subsequent direct-writing extrusion step by feeding from a gas source. In the present invention, the pressure of the gas source is preferably 200-800 KPa, more preferably 300-700 KPa, and most preferably 400-600 KPa.

In the present invention, the rate of the direct-writing extrusion is preferably 1-15 mm/s, more preferably 3-12 mm/s, and most preferably 5-10 mm/s. In the present invention, the nozzle diameter of the direct-writing extrusion is preferably 50-500 μm more preferably 100-400 μm and most preferably 200-300 μm. In the present invention, the manner of direct-writing extrusion preferably includes gas extrusion or screw extrusion. In the present invention, when the viscosity of the photosensitive polyimide ink is 900 mPa·s-4,500 mPa·s, the manner of extrusion is preferably gas extrusion; and the pressure for the gas extrusion is preferably 200 KPa-2 MPa, more preferably 500 Kpa-1.5 MPa, and most preferably 800 KPa-1 MPa. In the present invention, when the viscosity of the photosensitive polyimide ink is >5000 cP, the manner of extrusion is preferably screw extrusion; and the voltage for the screw extrusion is preferably 8-24 V, more preferably 10-20 V, and most preferably 14-18 V.

In the present invention, the intensity of the ultraviolet light source for ultraviolet curing is preferably 0.5-20 W/cm$^2$, more preferably 1-15 W/cm$^2$, and most preferably 5-10 W/cm$^2$.

In the present invention, by subjecting the photosensitive polyimide ink to direct-writing extrusion, and then immediately to UV-assisted curing in combination with a subsequent heat treatment, a direct-writing polyimide AM material having high strength, excellent thermomechanical stability and ultra-low volume deformation quantity can be formed.

Figure 1B:
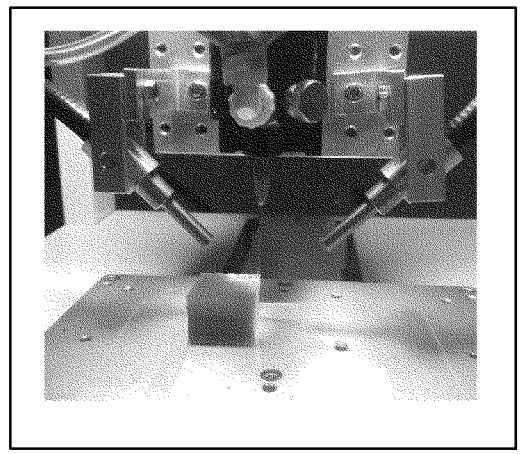
FIG. 1B is a photograph showing the extrusion-ultraviolet curing device of FIG. 1A in practice.

In the present invention, the apparatus required for the direct-writing extrusion and ultraviolet curing preferably includes a pneumatic supply 1, a needle extrusion system 4, a photosensitive polyimide ink 3, an ultraviolet source 2, and a three-dimensional molding platform 5; and the structure is as shown in FIGS. 1A and 1B. FIG. 1A illustrates the model and FIG. 1B illustrates the real object. In the present invention, the ultraviolet source 2 irradiates the needle tip portion of the needle extrusion system 4, such that the photosensitive polyimide ink 3 is subjected to ultraviolet irradiation immediately after it is extruded. In the present invention, the photosensitive polyimide ink is placed into a needle extrusion system, extruded by the needle extrusion system under the push of a gas from the pneumatic supply; irradiated by the ultraviolet source, and molded on the three-dimensional molding platform to obtain the polyimide precursor formed member.

In the present invention, after the polyimide precursor formed member is obtained, the polyimide precursor formed member is subjected to heat treatment to obtain the direct-writing polyimide AM material.

In the present invention, the atmosphere for the heat treatment preferably includes nitrogen gas, inert gas or vacuum; and more preferably vacuum. In the present invention, the vacuum degree for the heat treatment is preferably −0.08 to −0.1 MPa, more preferably −0.085 to −0.095 MPa, and most preferably −0.088 to −0.092 MPa.

In the present invention, the heat treatment preferably includes six stages of heating sequentially. In the present invention, the temperature for the stage-one heating is preferably 70-80° C., more preferably 72-78° C., and most preferably 74-76° C. In the present invention, the temperature retention time of the stage-one heating is preferably 0.5-1.5 h, more preferably 0.8-1.3 h, and most preferably 0.9-1.1 h. In the present invention, the heating rate for heating up to the temperature for the stage-one heating is preferably 0.5-2° C./min, more preferably 1-1.5° C./min, and most preferably 1.2-1.4° C./min.

In the present invention, the temperature for the stage-two heating is preferably 120-150° C., more preferably 125-145° C., and most preferably 130-140° C. In the present invention, the temperature retention time of the stage-two heating is preferably 1-2 h, more preferably 1.2-1.8 h, and most preferably 1.4-1.6 h. In the present invention, the heating rate for heating up to the temperature for the stage-two heating is preferably 2-4° C./min, more preferably 2.2-3° C./min, and most preferably 2.5-2.8° C./min.

In the present invention, the temperature for the stage-three heating is preferably 180-200° C., more preferably 185-195° C., and most preferably 188-192° C. In the present invention, the temperature retention time of the stage-three heating is preferably 1-2 h, more preferably 1.2-1.8 h, and most preferably 1.4-1.6 h. In the present invention, the heating rate for heating up to the temperature for the stage-three heating is preferably 1.5-2.5° C./min, more preferably 1.6-2.3° C./min, and most preferably 1.7-1.8° C./min.

In the present invention, the temperature for the stage-four heating is preferably 240-260° C., more preferably 245-255° C., and most preferably 248-252° C. In the present invention, the temperature retention time of the stage-four heating is preferably 1-3 h, more preferably 1.5-2.5 h, and most preferably 1.8-2.2 h. In the present invention, the heating rate for heating up to the temperature for the stage-four heating is preferably 0.5-2° C./min, more preferably 0.7-1.5° C./min, and most preferably 0.8-1° C./min.

In the present invention, the temperature for the stage-five heating is preferably 280-300° C., more preferably 285-295° C., and most preferably 288-293° C. In the present invention, the temperature retention time of the stage-five heating is preferably 1-1.5 h, more preferably 1.1-1.4 h, and most preferably 1.2-1.3 h. In the present invention, the heating rate for heating up to the temperature for the stage-five heating is preferably 1-3° C./min, more preferably 1.5-2.5° C./min, and most preferably 1.8-2° C./min.

In the present invention, the temperature for the stage-six heating is preferably 350-400° C., more preferably 360-390° C., and most preferably 370-380° C. In the present invention, the temperature retention time of the stage-six heating is preferably 0.5-1 h, more preferably 0.6-0.9 h, and most preferably 0.7-0.8 h. In the present invention, the heating rate for heating up to the temperature for the stage-six heating is preferably 0.5-2° C./min, more preferably 0.6-1.5° C./min, and most preferably 0.8-1.2° C./min.

In the present invention, after the heat treatment is completed, preferably the heat-treated polyimide precursor formed member is naturally cooled to room temperature.

The present invention has no limitation on the heat-treatment apparatus, and a heat-treatment apparatus well known to those skilled in the art may be used. Two examples of such are a vacuum constant-temperature constant-speed heating cabinet and a high-temperature program-controllable drying oven.

In the present invention, the heat treatment can realize imidization of the polyimide precursor, and the imidized direct-writing polyimide AM material has significant improvement in the mechanical strength, heat resistance and other properties.

The direct-writing polyimide AM material and the preparation method thereof as provided by the present invention will be described in detail in connection with the following embodiments, but they should not be construed as limiting the claimed scope of the present invention.

Embodiment 1

In this embodiment, a method for preparing a direct-writing polyimide AM material included the steps of: (1) subjecting a photosensitive polyimide ink to extrusion and ultraviolet curing, to obtain a polyimide precursor formed member, where, the photosensitive polyimide ink includes the following components in parts by weight: 50 parts of modified DuPont SP-1 photocurable polyamide acid (with the ratio of a grafted acrylic chain segment being 50%), 40 parts of the solvent N,N-dimethylformamide, 10 parts of the chain extender ethoxylated trimethylolpropane triacrylate, and 2 parts of the photoinitiator 819, where the photosensitive polyimide ink had a viscosity of 200,000 cP; an extrusion speed of 5 mm/s, a nozzle diameter for extrusion of 100 μm, a gas-source pressure of 400 KPa, a voltage for screw extrusion of 15 V, and an intensity of the ultraviolet source of 2 W/m$^2$; and (2) heat-treating the polyimide precursor formed member obtained in step (1) under vacuum, and cooling to room temperature to obtain the direct-writing polyimide AM material; where the heat treatment process is: heating up to 80° C. at 1.2° C./min and keeping at this temperature for 1 h; heating up to 150° C. at 3° C./min and keeping at this temperature for 1 h; heating up to 180° C. at 1.5° C./min and keeping at this temperature for 1 h; heating up to 240° C. at 1.5° C./min and keeping at this temperature for 1 h; heating up to 300° C. at 1° C./min and keeping at this temperature for 1 h; and heating up to 350° C. at 1.5° C./min and keeping at this temperature for 0.5 h.

The performance of the direct-writing polyimide AM material was determined using GB/T 1040-2006 and GB□T 31850-2015, and the determined results were: a bending strength of 150 MPa, a tensile strength of 95 MPa, an elongation at break of 7%, a bending modulus of 2.5 GPa, a thermal deformation temperature of 210° C., a glass transition temperature of 300° C., a maximum thermal-decomposition temperature of 500° C., a volume shrinkage of 5.4%, and a dielectric constant of 2.5-3.0.

Embodiment 2

In this further embodiment, a method for preparing a direct-writing polyimide AM material included the steps of: (1) subjecting a photosensitive polyimide ink to extrusion and ultraviolet curing, to obtain a polyimide precursor formed member, where, the photosensitive polyimide ink includes the following components in parts by weight: 50 parts of modified domestic PI-100 photocurable polyamide acid (with the ratio of a grafted acrylic chain segment being 70%), 45 parts of the solvent N,N-dimethylacetamide, 7.5 parts of the chain extender ethoxylated pentaerythritol tetraacrylate, and 2.5 parts of the photoinitiator 184D, where the ink had a viscosity of 500,000 cP; an extrusion speed of 10 mm/s, a nozzle diameter for extrusion of 200 μm, a gas-source pressure of 600 KPa, a voltage for screw extrusion of 20 V, and an intensity of the ultraviolet source of 5 W/m$^2$; and (2) heat-treating the polyimide precursor formed member obtained in step (1) under vacuum, and cooling to room temperature to obtain the direct-writing polyimide AM material; where the heat treatment process is: heating up to 75° C. at 1.5° C./min and keeping at this temperature for 1.5 h; heating up to 150° C. at 2° C./min and keeping at this temperature for 1 h; heating up to 180° C. at 2° C./min and keeping at this temperature for 1 h; heating up to 240° C. at 1.8° C./min and keeping at this temperature for 1 h; heating up to 300° C. at 2.5° C./min and keeping at this temperature for 1 h; and heating up to 350° C. at 1° C./min and keeping at this temperature for 0.5 h.

The performance of the direct-writing polyimide AM material was determined using the method of Embodiment 1, and the determined results were: a bending strength of 180 MPa, a tensile strength of 90 MPa, an elongation at break of 8%, a bending modulus of 2.8 GPa, a thermal deformation temperature of 245° C., a glass transition temperature of 250° C., a maximum thermal-decomposition temperature of 450° C., a volume shrinkage of 6%, and a dielectric constant of 2.5-3.0.

Embodiment 3

In another embodiment, a method for preparing a direct-writing polyimide AM material included the steps of: (1) subjecting a photosensitive polyimide ink to extrusion and ultraviolet curing, to obtain a polyimide precursor formed member, where, the photosensitive polyimide ink includes the following components in parts by weight: 40 parts of modified DuPont CR-6100 photocurable polyamide acid (with the ratio of a grafted acrylic chain segment being 80%), 40 parts of the solvent N,N-dimethylacetamide, 10 parts of the reactive diluent polyethylene glycol (400) diacrylate, 10 parts of the chain extender dipentaerythritol hexaacrylate, and 2 parts of the photoinitiator 819, where the ink had a viscosity of 45,000 cP; an extrusion speed of 2 mm/s, a nozzle diameter for extrusion of 330 μm, a gas-source pressure of 800 KPa, a voltage for screw extrusion of 15 V, and an intensity of the ultraviolet source of 8 W/m$^2$; and (2) heat-treating the polyimide precursor formed member obtained in step (1) under vacuum, and cooling to room temperature to obtain the direct-writing polyimide AM material; where the heat treatment process is: heating up to 80° C. at 1.2° C./min and keeping at this temperature for 1.5 h; heating up to 150° C. at 2° C./min and keeping at this temperature for 1 h; heating up to 190° C. at 2° C./min and keeping at this temperature for 1 h; heating up to 240° C. at 1° C./min and keeping at this temperature for 1 h; heating up to 300° C. at 2° C./min and keeping at this temperature for 1 h; and heating up to 350° C. at 2° C./min and keeping at this temperature for 0.5 h.

The performance of the direct-writing polyimide AM material was determined using a method same as that of Embodiment 1, and the determined results were: a bending strength of 250 MPa, a tensile strength of 180 MPa, an elongation at break of 5%, a bending modulus of 3 GPa, a thermal deformation temperature of 250° C., a glass transition temperature of 245° C., a maximum thermal-decomposition temperature of 550° C., a volume shrinkage of 6.5%, and a dielectric constant of 1.5-2.5.

Embodiment 4

In this embodiment, a method for preparing a direct-writing polyimide AM material included the steps of: (1) subjecting a photosensitive polyimide ink to extrusion and ultraviolet curing, to obtain a polyimide precursor formed member, where, the photosensitive polyimide ink includes the following components in parts by weight: 50 parts of modified domestic RC-PAA-F photocurable polyamide acid (with the ratio of a grafted acrylic chain segment being 80%), 30 parts of the solvent tetrahydrofuran, 15 parts of the reactive diluent triethylene glycol divinyl ether, 5 parts of the chain extender propoxylated glyceryl triacrylate, 3 parts of the photoinitiator 819, where the ink had a viscosity of 1,000,000 cP; an extrusion speed of 10 mm/s, a nozzle diameter for extrusion of 250 μm, a gas-source pressure of 500 KPa, a voltage for screw extrusion of 18 V, and an intensity of the ultraviolet source of 4 W/m$^2$; and (2) heat-treating the polyimide precursor formed member obtained in step (1) under vacuum, and cooling to room temperature to obtain the direct-writing polyimide AM material; where the heat treatment process is: heating up to 80° C. at 1.4° C./min and keeping at this temperature for 1 h; heating up to 150° C. at 2.5° C./min and keeping at this temperature for 1 h; heating up to 200° C. at 2.5° C./min and keeping at this temperature for 1 h; heating up to 240° C. at 1.8° C./min and keeping at this temperature for 1 h; heating up to 300° C. at 2° C./min and keeping at this temperature for 1 h; and heating up to 350° C. at 1° C./min and keeping at this temperature for 0.5 h.

The performance of the direct-writing polyimide AM material was determined using a method same as that of Embodiment 1, and the determined results were: a bending strength of 180 MPa, a tensile strength of 80 MPa, an elongation at break of 6%, a bending modulus of 2 GPa, a thermal deformation temperature of 200° C., a glass transition temperature of 260° C., a maximum thermal-decomposition temperature of 480° C., a volume shrinkage of 4.5%, and a dielectric constant of 2-2.5.

It can be seen from the Embodiments described above that the direct-writing polyimide AM material obtained by using the preparation method of the present invention has excellent comprehensive properties, has a bending strength of 150-250 MPa, a tensile strength of 80-200 MPa, an elongation at break of 5%-15%, a bending modulus of 1.5-3 GPa, a thermal deformation temperature of 200-300° C., a glass transition temperature of 200-300° C., a maximum thermal-decomposition temperature of 450-600° C., a volume shrinkage of 4-8%, and a dielectric constant of 1.5-3.0.

Several examples are used for illustration of the principles and implementation methods of the present invention. The description of the embodiments is used to help illustrate the method and its core principles of the present invention. In addition, those skilled in the art can make various modifications in terms of specific embodiments and scope of application in accordance with the teachings of the present invention. In conclusion, the content of this specification shall not be construed as a limitation to the invention.

The embodiments described above are only descriptions of preferred embodiments of the present invention and are not intended to limit the scope of the present invention. Various variations and modifications can be made to the technical solution of the present invention by those of ordinary skill in the art, without departing from the design and spirit of the present invention. The variations and modifications should all fall within the claimed scope defined by the claims of the present invention.

What is claimed is:

1. A direct-writing polyimide additive manufacturing (AM) material, which is obtained by a preparation method comprising:
   (1) conducting ultraviolet curing immediately after a photosensitive polyimide ink is subjected to direct-writing extrusion, to obtain a polyimide precursor formed member; and
   (2) heat-treating the polyimide precursor formed member obtained in step (1) to obtain the direct-writing polyimide AM material, wherein heat-treating of step (2) includes the following steps, in sequence:
      heating up to 70-80° C. and keeping at this temperature for 0.5-1.5 h;
      then heating up to 120-150° C. and keeping at this temperature for 1-2 h;
      then heating up to 180-200° C. and keeping at this temperature for 1-2 h;
      then heating up to 240-260° C. and keeping at this temperature for 1-3 h;
      then heating up to 280-300° C. and keeping at this temperature for 1-1.5 h; and
      then heating up to 350-400° C. and keeping at this temperature for 0.5-1 h,
   wherein the direct-writing polyimide AM material has a bending strength of 150-250 MPa, a tensile strength of 80-200 MPa, an elongation at break of 5%-15%, a bending modulus of 1.5-3 GPa, a thermal deformation temperature of 200-300° C., a glass transition temperature of 200-300° C., a maximum thermal-decomposition temperature of 450-600° C., a volume shrinkage of 4-8%, and a dielectric constant of 1.5-3.0.

2. The direct-writing polyimide AM material of claim 1, wherein a rate of direct-writing extrusion in step (1) is 1-15 mm/s.

3. The direct-writing polyimide AM material of claim 2, wherein a nozzle diameter of a direct-writing extrusion in step (1) is 50-500 μm.

4. The direct-writing polyimide AM material of claim 1, wherein the direct-writing extrusion in step (1) comprises gas extrusion or screw extrusion.

5. The direct-writing polyimide AM material of claim 1, wherein an intensity of an ultraviolet light source for ultraviolet curing in step (1) is 0.5-20 W/cm$^2$.

6. The direct-writing polyimide AM material of claim 1, wherein the photosensitive polyimide ink of step (1) comprises the following components in parts by weight:
   40-60 parts of a photocurable polyamic acid resin,
   10-50 parts of a diluent,
   1-10 parts of a chain extender,
   1-3 parts of an initiator, and
   5-40 parts of a solvent; and
   the photosensitive polyimide ink has a viscosity of $10^3$-$10^7$ cP.

7. The direct-writing polyimide AM material of claim 1, wherein an atmosphere for heat treatment in step (2) comprises nitrogen gas, inert gas or vacuum.

\* \* \* \* \*

UNITED STATES PATENT AND TRADEMARK OFFICE
CERTIFICATE OF CORRECTION

PATENT NO. : 11,020,895 B2
APPLICATION NO. : 16/255049
DATED : June 1, 2021
INVENTOR(S) : Xiaolong Wang et al.

Page 1 of 1

It is certified that error appears in the above-identified patent and that said Letters Patent is hereby corrected as shown below:

On the Title Page

Column 1, Approximately Line 30, Missing Item (30) Foreign Application Priority Date and should read -- (30) Foreign Application Priority Date July 5, 2018 (CN) 201810731353.7 --

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*